Aug. 30, 1927.  
W. C. FLINTHAM ET AL  
1,640,401  
WASHING AND STERILIZING DEVICE  
Filed May 3, 1926  
3 Sheets-Sheet 1

Inventors  
William C. Flintham,  
Elmer H. Bridenbaugh.  
By  
Attorney

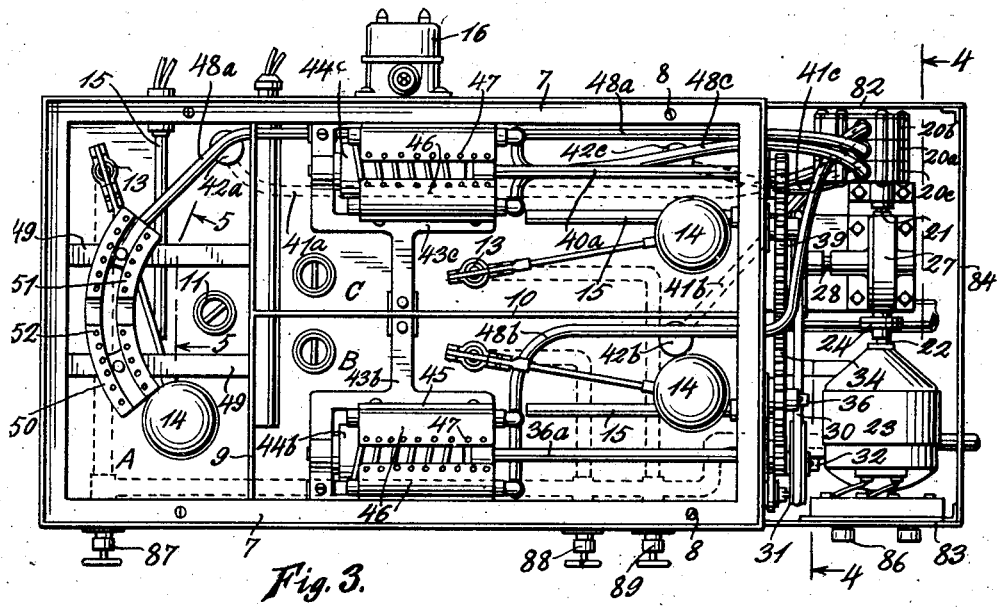

Patented Aug. 30, 1927.

1,640,401

UNITED STATES PATENT OFFICE.

WILLIAM C. FLINTHAM AND ELMER H. BRIDENBAUGH, OF DENVER, COLORADO; SAID BRIDENBAUGH ASSIGNOR TO SAID FLINTHAM.

WASHING AND STERILIZING DEVICE.

Application filed May 3, 1926. Serial No. 106,843.

This invention relates to improvements in sterilizing devices and has reference more specifically to a machine for washing, sterilizing and rinsing drinking glasses in restaurants and other places where a large number of drinking glasses or cups are used.

It is the object of this invention to produce a machine that will be entirely automatic in its operation and into which soiled glasses or cups may be placed and which will wash, sterilize and rinse them and deliver them ready for use.

The washing is accomplished by means of some cleansing solution such as soap and water, the sterilizing by means of some sterilizing liquid such as a solution of NaOH or some of the solutions that contain readily releasable chlorine gas, while the rinsing is accomplished by means of clean hot water.

The invention can be most clearly described and will be most readily understood when reference is had to the accompanying drawing where the preferred embodiment thereof has been illustrated and in which:

Fig. 3 is a plan view of the lower structure after the upper portion has been removed;

Fig. 4 is a vertical section taken on line 4—4, Fig. 3;

Fig. 5 is a side elevation of the nozzle for spraying the sterilizing liquid taken on the line 5—5, of Fig. 3;

Fig. 9 is a partial top plan view of a slightly modified construction.

Figure 2:
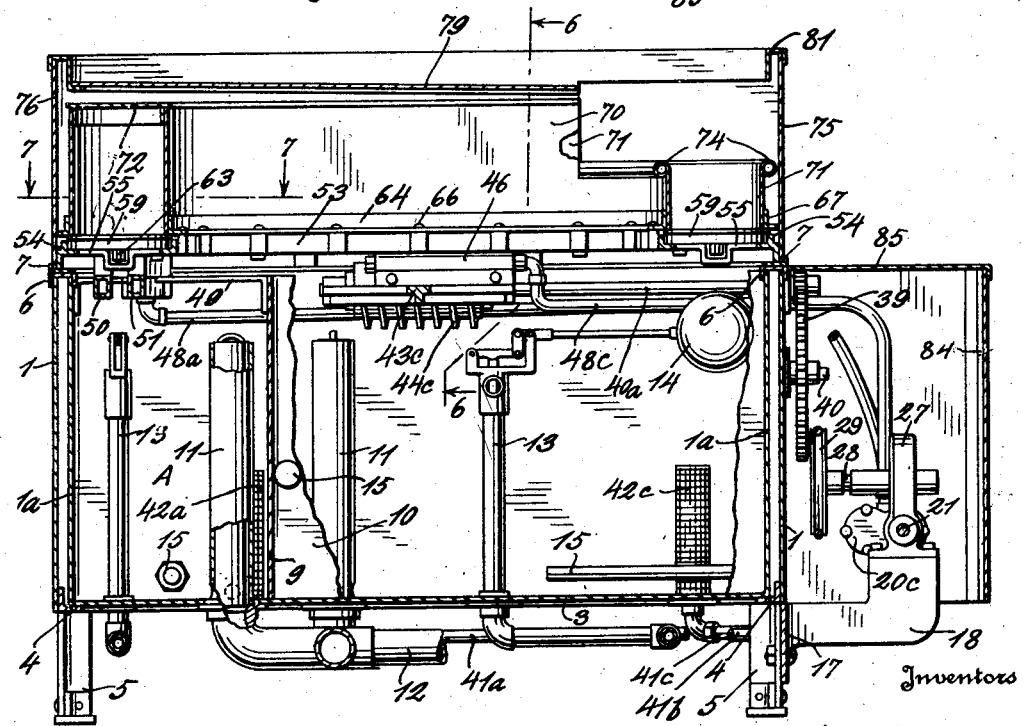
Fig. 2 is a section taken on line 2—2, Fig. 1.

This device consists of a tank having spaced end walls 1, 1$^a$ and spaced side walls 2, 2$^a$ and a bottom 3 which is secured to the lower edges of the ends 1$^a$ and sides 2$^a$ and form with them a water tight tank which rests upon the inturned flanges 4 of the angle iron frame which in turn is supported on the legs 5. A frame 6 of channel iron rests upon the top of the sides and end members of the tank so as to form an enclosed space and to provide a smooth surface on which the angle iron frame 7 rests and to which it may be secured by means of screws 8. The tank is divided into three compartments A, B and C by means of a transverse wall 9 and a longitudinal wall 10. Each of these compartments has a drain 11 all of which are connected by suitable means to the drain pipe 12 (Fig. 2). Each of the compartments has been shown as provided with an inlet pipe and valve 13 which is controlled by a float 14. The purpose of these float controlled inlets is to automatically maintain the liquid in the several chambers at a predetermined level. It is to be understood, however, that these float operated valves may be dispensed with and other valves substituted. Each chamber is also provided with an electric heater 15 whose operation is controlled by means of the switch 16. Secured to the legs 5 at one end of the tank is a plate 17 carrying brackets 18 and 19. Secured to the bracket 18 are three rotary gear pumps 20$^a$, 20$^b$ and 20$^c$ which have a common drive shaft 21 that is connected to the shaft 22 of the motor 23 by means of a coupling 24. A worm 25 is either formed integral with or connected to the shaft 21 and serves to rotate the worm gear 26 that is enclosed in the casing 27 and is secured to the shaft 28 that in turn carries the belt wheel 29. A belt 30 connects the wheel 29 with the wheel 31 (Fig. 4). The shaft 32 is secured to the arm 35 which is pivoted to the shaft 36 and has its free end provided with a transverse notch 37 with which the clamping device 38 cooperates so as to permit the arm to be moved about its pivot 36 for the purpose of tightening the belt 30. Another gear wheel 39 of the same size as wheel 34 is secured to the shaft 40 and meshes with the gear 34 in the manner shown in Fig. 4. It is now evident that the motor when in operation rotates the gear pumps and rotates shafts 36$^a$ and 40$^a$ in opposite directions. A pipe 41$^a$ extends from the intake port of the pump 20$^a$ to the strainer 42$^a$ in a compartment A. A similar pipe 41$^b$ extends from the intake port of pump 20$^b$ to the strainer 42$^b$ in compartment B and a pipe 41ᶜ connects the intake port of pump 20ᶜ to the strainer 42ᶜ in compartment C. Frames 43ᵇ and 43ᶜ are secured between wall 10 and wall 2ᵃ of compartments B and C respectively in the manner shown in Figs. 3 and 6. Worms 44ᵇ and 44ᶜ are rotatably mounted in frames 43ᵇ and 43ᶜ respectively and are respectively attached to the shafts 36ᵃ and 40ᵃ. Each of the frames 43ᵇ and 43ᶜ have upwardly extending spaced parallel flanges 45 to each of which a sprinkler head 46 is connected. These sprinkler heads have each a row of openings 47. The sprinkler heads on the frame 43ᵇ are connected by means of a pipe 48ᵇ to the delivery port of the pump 20ᵇ while pipe 48ᶜ connects the sprinkler heads on frame 43ᶜ with the delivery port of pump 20ᶜ. Bars 49 (Figs. 2 and 3) extend from one side to the other of compartment A and serve to support a sprinkler head which comprises two hollow parallel curved arms 50 and 51 that are connected at their ends in the manner shown in Fig. 3. The arms 50 and 51 have their upper sides provided with a number of openings 52 and are connected with the delivery port of pump 20ᵃ by means of a pipe 48ᵃ. When the compartments A, B and C contain liquid and the pumps 20 are rotated, the pumps will force liquid into the sprinkler heads to which they are connected and take liquid from the compartments through the strainers.

Figure 1:
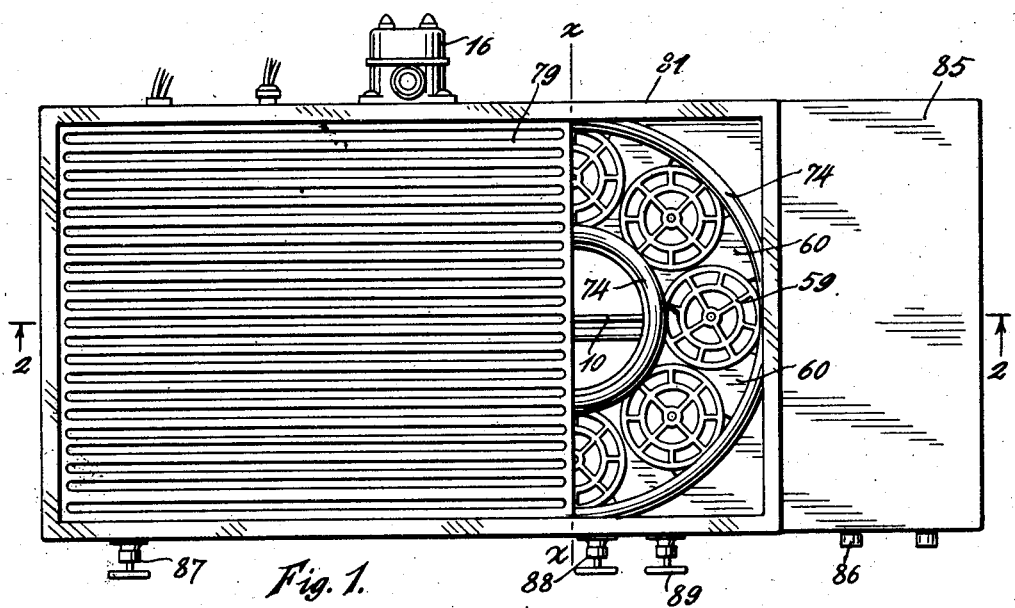
Fig. 1 is a top plan view of the assembled apparatus.
Figure 6:
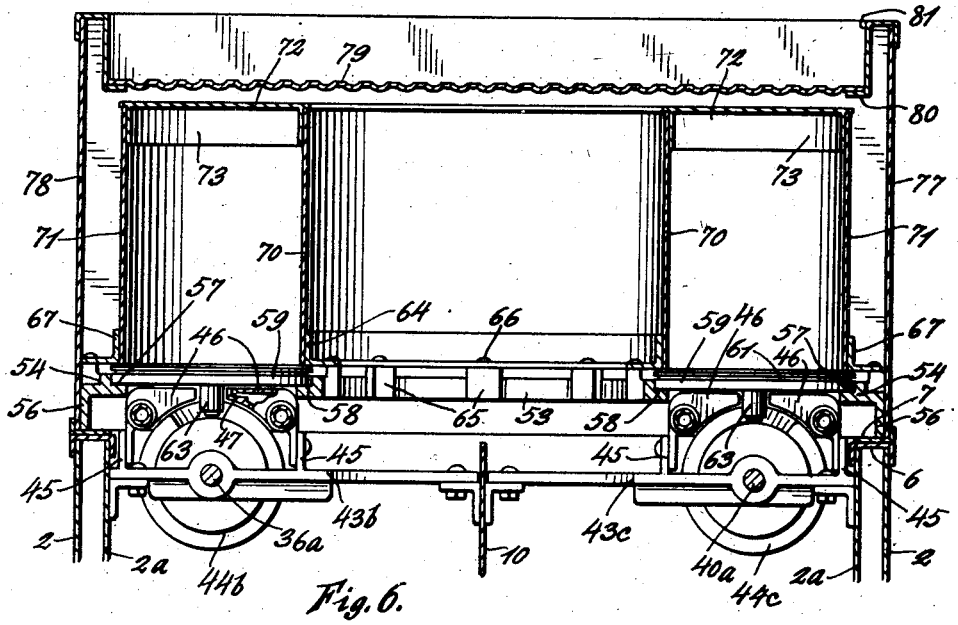
Fig. 6 is a section taken on line 6—6, Fig. 2.
Figure 7:
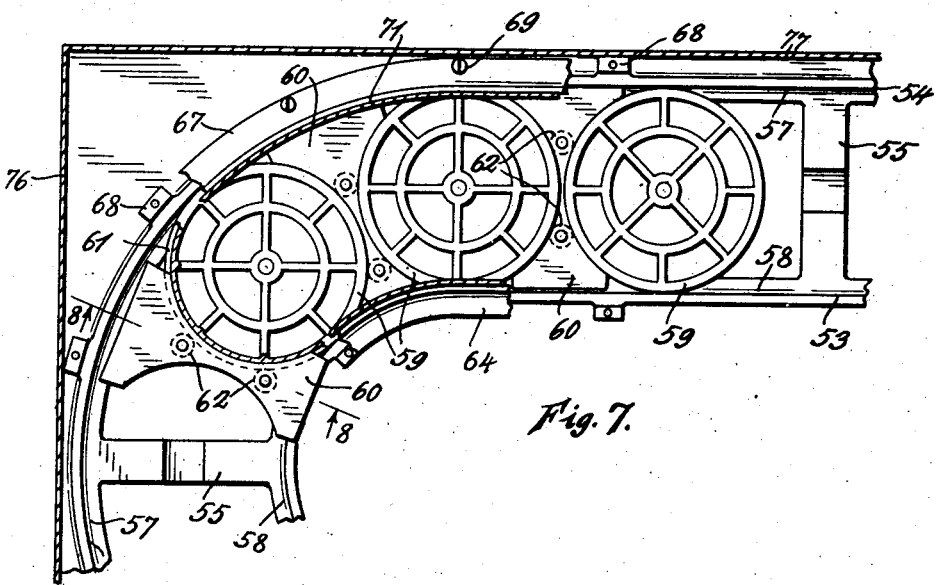
Fig. 7 is a fragmentary plan view and section looking downwardly in the direction of the arrows 7 in Fig. 2.
Figure 8:
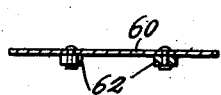
Fig. 8 is a section through one of the spacer plates and is taken on line 8—8, Fig. 7.

A metal frame, comprising two parallel members 53 and 54 integrally connected by means of parts 55 has the member 54 provided with a downwardly extending flange 56 that is adapted to rest upon the upper surface of the angle 7 (Fig. 6). It will be noted that these frame members are provided on their upper adjacent surfaces with rabbets 57 and 58 that form a continuous track in which the circular supporting member 59 and the spacing plates 60 are guided. The peripheries of the disks 59 are provided with grooves 61 for the reception of the concave edges of the spacing plates 60 (Fig. 7). The sizes of the disks 59 and of the spacing plates 60 are such that the number employed will fill the space between the track members 53 and 54 in the manner shown in Fig. 7. From Fig. 8 it will be seen that the plates 60 are provided on their undersides with rollers 62 against which the peripheries of the disks 59 engage, and which therefore keeps them properly spaced at all times. Attention is called at this point to the roller 63 that projects downwardly from the center of each of the disks 59. These rollers project downwardly so far that they engage the grooves in the worms 44ᵇ and 44ᶜ in the manner shown in Fig. 6 so that when the worms are rotated they will propel the disks 59 along the track formed by members 53 and 54. The worms are preferably longer than the distance between the rollers 63 so that a roller will always be in contact with the worm. It will be noted that the worms 44ᵇ and 44ᶜ are respective left and right hand. An angle iron frame 64 is secured to the lugs 65 of the frame member 53 by means of screws 66 while a similar angle iron frame 67 is secured to lugs 68 of frame member 54 by means of screws 69. Sheet metal wall members 70 and 71 are secured to the upright flanges of angles 64 and 67 respectively and support a cover 72 whose downwardly extending flanges 73 project down between the sides 70 and 71 in the manner shown in Fig. 6. That portion of the walls 70 and 71 that lies to the right of the line $x$—$x$ Fig. 1 is only of about one-half the height as the remaining portion and the upper edges are rolled in the manner shown in Figs. 2 and 6 and indicated by numeral 74.

A rectangular enclosure formed by end walls 75, 76 and side walls 77 and 78 is supported on the angle iron frame 7 (Fig. 6) and supports a drain board 79 whose end and sides are supported on the inturned flanges 80 of the supporting frame 81.

The motor, pumps, belt and gears are enclosed by end members 82, 83, side 84 and top 85. A switch 86 serves to start and stop the motor and valves 87, 88 and 89 control the pipes through which water is admitted to the several chambers. As has been before intimated, the float valves 13 may be omitted and the admission of the water controlled entirely by valves 87, 88 and 89.

Fig. 9 shows how the device can by a slight modification be made to automatically deliver the washed and sterilized glasses 90 onto the top 85. This is accomplished by providing a gap in the outer wall 71 and providing a deflector rail 91 so that the glasses or cups will strike the deflector 91 and be directed onto the top 85 which may be provided with an upwardly extending wall 92 which prevents the glasses from being pushed off.

Let us now assume that the machine has been assembled in the manner described and that the compartments A, B and C are each filled with water to the top of the overflow pipes 11. The water in the compartment C is mixed with soap so as to form a strong cleansing solution, while the water in compartment B is usually clear water which is used for rinsing purposes. In compartment A I use some sterilizing solution such as a strong sodium hydroxide solution or some liquid that carries chlorine gas which it readily gives up. There are many such sterilizing solutions on the market today. Any of these can be used for the purpose I have in mind. The solutions in the different compartments is now raised to the heat desired by means of the electric heaters. When the motor is started the pumps will be put into operation and these will take solutions from the compartments to which they are connected and force the same out through the openings in the sprinkler heads. At the same time the shafts 40 and 36 will be rotated thereby rotating the worms 44$^b$ and 44$^c$. These worms acting upon the rollers 63 will cause the disks 59 and the spacing plates 60 to be moved around the track in the manner heretofore described. The glasses or cups which are to be washed and sterilized are placed upside down on the disks 59 and when they pass over the sprinkler head 46 that encloses the worm 44$^c$ they will be sprayed by the cleansing solution. They will then pass on until they come over the sprinkler head comprising the two arms 51 and 52 where they will be subjected to a spray of sterilizing solution after which they are brought into place above the sprinkler head that encloses the worm 44$^b$ where they are subjected to a spray of clean rinsing water. After this they may be removed by hand from the rotating disks and placed upon the drain board 79, or, if the machine is made in the manner indicated in Figure 9, the glasses will pass out upon the top 85 where they will accumulate and from which they may be removed whenever desired.

From the above it will be seen that we have provided a washing and sterilizing machine that is automatic in its operation and that will continuously pass the glasses and cups that are to be washed and sterilized successively over cleansing, sterilizing and rinsing solutions and deliver them in a thoroughly cleansed and sterilized condition upon the support 85.

It is apparent that a machine of this type will be of great use in connection with restaurants or soda water fountains or any place where a large number of drinking glasses or cups are used and where it is desirable to obtain thorough sterilization as well as cleansing.

Having now described my invention, what I claim as new is:

1. A conveyor comprising a track formed from two parallel members, a plurality of perforated circular disks slidably mounted on said track members, a spacing plate located between each pair of adjacent disks and means for maintaining said disks and plates in the same plane.

2. A conveyor comprising an endless track formed from two endless members spaced from each other, a plurality of circular disks supported on the track members, said disks having peripheral grooves, spacing plates having their opposite sides curved so as to engage in the grooves, each of said plates having two downwardly extending rollers adapted to serve as spacers for the disks and means for causing said disks and spacer plate to be moved along said track.

3. A conveyor comprising an endless track formed from two endless members spaced from each other, a plurality of circular disks supported on the track members, said disks having peripheral grooves, spacing plates having their opposite sides curved so as to engage in the grooves, each of said plates having two downwardly extending rollers adapted to serve as spacers for the disks and means for causing said disks and spacer plates to be moved along said track, said means comprising a worm located beneath the track, means on the disks for engaging the worm and means for rotating the worm.

4. A conveyor comprising a track formed from two parallel members, a plurality of perforated circular disks slidably secured to the track members, said disks having a peripheral groove and spacing plates having opposite sides concave and adapted to fit said grooves.

5. A conveyor comprising a track formed from two parallel members, a plurality of perforated circular disks slidably secured to the track members, said disks having a peripheral groove, spacing plates having opposite sides concave and adapted to fit said grooves and spacing rollers extending downwardly from said plates.

In testimony whereof we affix our signatures.

WILLIAM C. FLINTHAM.
ELMER H. BRIDENBAUGH.